March 22, 1932. J. J. LAWLER 1,850,282
DEVICE FOR PROTECTING SEWERS
Filed July 13, 1928
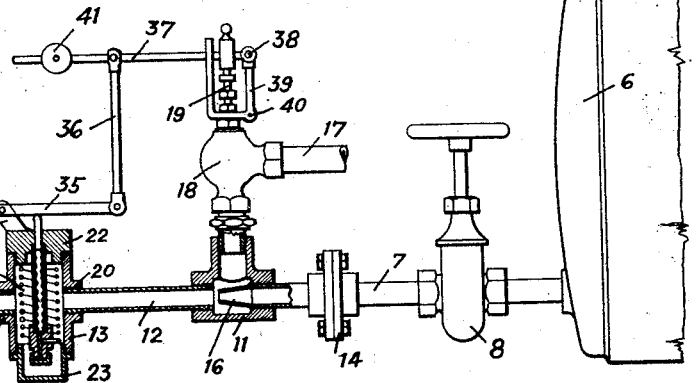
Fig. 1.
Fig. 2.
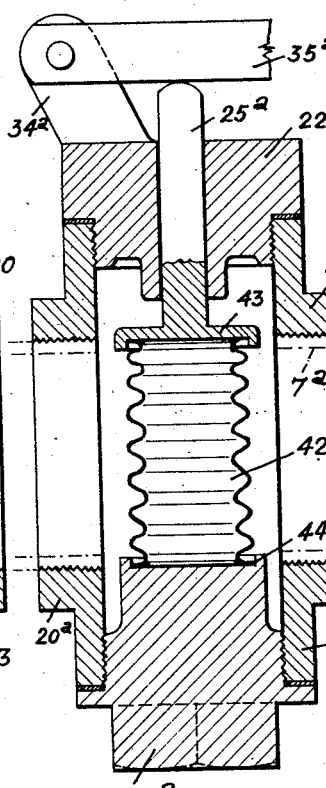
Fig. 3.
Fig. 4.
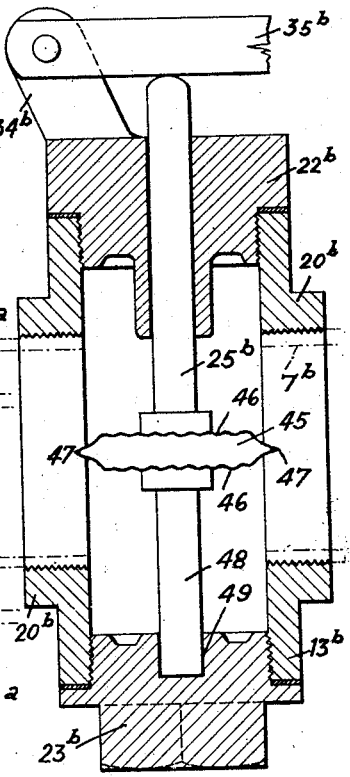
INVENTOR
James J. Lawler
BY
ATTORNEY Patented Mar. 22, 1932

1,850,282

UNITED STATES PATENT OFFICE

JAMES J. LAWLER, OF MOUNT VERNON, NEW YORK, ASSIGNOR TO DIRECT CONTROL VALVE COMPANY, OF CHICAGO, ILLINOIS, A CORPORATION OF DELAWARE

DEVICE FOR PROTECTING SEWERS

Application filed July 13, 1928. Serial No. 292,346.

This invention relates to improvements in devices for protecting sewers, receiving vats or tanks, and other similar receiving systems, from the introduction of steam or excessively hot water, and with reference to some of its more particular features, the invention relates to improvements in such protective devices which are automatically controlled by thermostatic means.

It is a general object of the invention to provide an improved control device of the type mentioned which is especially sensitive and quickly responsive to temperature variation so as to prevent the flow of steam or hot water with a minimum of delay.

A further object is to provide an improved control device of the type mentioned which is especially compact as compared with known devices and is simple in construction and may readily be installed either in new or old installations.

A further object is to provide an improved control device of the type mentioned in which a thermostatic control element designed for high sensitivity and quick thermal response is arranged so as to come directly into contact with the flow of fluid being controlled, whereby response to temperature changes is practically instantaneous and control over the fluid flow quickly exerted.

Another object of the invention is to provide in a control device of the type mentioned an improved means for mounting a thermostat in a conduit whereby movements upon contraction or expansion of the thermostat are transmitted to points externally of the conduit with a minimum of friction or other obstruction, while at the same time providing fluid-proof joints to prevent escape of fluid from the conduit.

Other objects will be in part pointed out in the following detailed description of certain illustrative but preferred embodiments of the invention, and will be in part obvious in connection therewith.

For a more complete understanding of the nature and objects of the invention, reference is had to the following detailed description and to the accompanying drawings, in which:

Fig. 1 is a partially diagrammatic elevational view, parts being in section, of a system for discharging boilers or the like into sewers, and embodying the invention;

Fig. 2 is an enlarged central vertical sectional view of a fitting for the discharge conduit and embodying in its construction a preferred form of the sensitive thermostatic control element;

Fig. 3 is a view similar to Fig. 2 but showing a modified form of the thermostatic element, and Fig. 4 is a view similar to Fig. 2 showing another modified form of the thermostatic element.

If live steam or excessively hot water, which might form steam upon decrease of pressure, enters a sewer or similar discharge-receiving system, it gives rise to unfavorable conditions understood by sanitary engineers. If steam enters the sewer it may be discharged therefrom, either mixed or unmixed with noxious sewer gases, into the street through vents, manhole covers, or street sewer basins, so as to be a nuisance as well as a source of danger to persons. It may be also a source of danger and damage to the sewer itself and to the soil and waste pipe lines connected with buildings.

Referring to the drawings for a detailed description of the embodiments of the invention there shown, and first to the embodiment shown in Figs. 1 and 2, a steam boiler or the like is diagrammatically shown at 6 and a discharge pipe or conduit 7 is shown in which may be positioned a blow-off valve 8. The invention is adapted for operation in connection with boilers of different types and of high or low pressure such as are used, for example, in commercial and industrial applications. Such boilers are ordinarily blown off at intervals for cleaning them out and for other purposes, the discharge being conducted into the city or other sewers. The boiler is shown merely to illustrate one application of the invention. The invention, however, is applicable to protect sewers, soil and waste pipe lines, etc. from steam and hot water coming from other types of installation, such as the discharge from radiation systems which sometimes actually discharge live steam, or from leaky steam traps, etc.

For automatically controlling flow of steam or excessively hot water through the conduit 7, the thermostatic control mechanism shown in Fig. 1 is preferably installed. This control mechanism as shown may include the water inlet connection 11, the conduit section 12, and the thermostatic control fitting 13. The control mechanism may be connected and installed as a unit in the conduit by means of couplings 14, and the section 15 of the conduit is connected to the sewer pipe 9 on the far side of the house trap 10.

Embodied in the water inlet union, or fitting, is an injector nozzle or cone 16 connected in the discharge conduit, and the water inlet into the conduit is positioned adjacent to the nozzle 16. The water pipe 17 leads from a suitable supply through the control valve 18 having a control stem 19 for opening and closing the valve. It will be understood, by those familiar with the art, that due to the arrangement of the nozzle 16 and the water inlet, there will be an injector action when fluid issues through the nozzle, thus tending to draw the water into the discharge conduit.

The thermostatic fitting 13 as shown forms a section of the discharge conduit having oppositely disposed threaded extensions 20 for connection to the adjacent sections of the conduit. The fluid flow through the conduit therefore passes directly through the thermostatic fitting and through an interior compartment, or chamber 21 thereof containing the sensitive thermostatic element.

At one side the fitting is provided with a threaded opening in which is normally seated a threaded cap or plug 22 having an opening extending transversely therethrough for the reception of operating connections to the thermostat. Also, preferably a second threaded opening is formed in the fitting opposite to the first mentioned opening and is also provided with a threaded cap or plug 23. Both plugs preferably fit tightly into their respective openings and each may be provided with packing for making a tight joint.

According to the modification of the invention shown in Fig. 2, the main sensitive thermostatic element is preferably in the form of a circumferentially corrugated tube or cell 24 which may be elongated as desired, and to one end of which is sealed an operating plunger or stem 25 passing through the aperture of the cap 22. A protective tubular casing 26 may surround the thermostatic cell, preferably being of an internal diameter about the same as the external diameter of the cell so as to brace and support the latter and keep it from bending or buckling under pressure. The protective tube may be threaded to the cap 22 so as to make a fluid tight joint therewith, said tube as well as the complete thermostatic element being thus supported from the cap. At their opposite adjacent ends the thermostatic cell 24 and protective casing 26 are connected to a block or header 27. These parts are preferably soldered or brazed to the header and to each other so as to make a fluid tight joint.

The header 27 is provided with an internal chamber or cavity 28 communicating with the interior of the cell 24 and preferably extending to the outer end of the header so as to provide a filling passageway for the insertion into the cell of a thermo-responsive liquid. A threaded sealing cap 29 fits over the outer end of the header and may be screwed tightly thereon with a sealing fit, being provided with a sealing washer if desired.

There may be, and preferably is, one or more temperature sensitive tubes in extension of the cell 24 so as to increase the sensitivity of the thermostat to temperature changes. Such temperature sensitive tube as shown is preferably in the form of a coiled metallic tube providing the tubular coil 30 sealed at one end as at 31 and connected and sealed at the opposite end as at 32 to the header.

The interior of the coil 30 is thus in communication with the interior of the cell 24 through the chamber 28 of the header, forming in effect a single sensitive thermostatic element having a large surface to facilitate exchange of heat. The interior compartment or chamber of the complete thermostatic element thus formed is preferably filled with thermo-responsive liquid such as kerosene, or the like.

It will be observed that the sensitive thermostatic element extends directly into and across the chamber 21 of the thermostatic fitting and thus is positioned so as to be directly impinged by the fluid flowing in the discharge conduit. Any rise or fall of temperature in the fluid flow will thus be immediately communicated to the sensitive thermostatic element.

Also the caps or plugs 22 and 23 are preferably arranged respectively adjacent opposite ends of the sensitive thermostatic element thus facilitating installation or removal of the latter. The cap 23 may also be removed while the thermostat is in operative position for inspection, adjustment, etc. of the latter.

As shown in Fig. 2, the guiding and protecting tube 26 may be, and preferably is, imperforate so as to prevent fluid in the discharge conduit entering the interior of the protecting tube. Due to this arrangement, the plunger or stem 25 can fit quite loosely in the aperture in the plug 22 so as to be freely movable and to avoid friction and other obstruction to movements transmitted by the thermostat to external points. This arrangement helps to increase the sensitivity of the thermostat and its quickness of response to temperature changes.

The plug 25 may extend at its inner end into the adjacent end of the tube 26, as shown, and preferably has an extension of reduced diameter entering the end of the thermostatic element 24 and firmly sealed thereto as indicated at 33. In cases where it is desired that the fluid in the discharge conduit 7 be allowed to flow into direct contact with the thermostatic element 24, the protective tube 26 may be provided with openings through the walls thereof so as to admit the fluid to the interior. In such cases, it will be desirable to provide means to prevent escape of fluid past the stem 25.

For transmitting movement from the thermostat to operate the valve 18 of the water supply pipe, a system of connections may be provided as shown in Fig. 1. The plug 22 as shown is provided with a lug 34 to which is pivoted a lever 35 connected at its free end by a link 36 to a lever 37, fulcrumed at 38 to a supporting member 39, pivotally supported at 40. The lever 35 is positioned so as to be contacted by the plunger 25, and the lever 37 is connected to the valve stem 19 of the valve 18.

It will therefore be seen that expansive movements of the thermostat will be transmitted to move the valve stem 19 upwardly thus opening the valve 18 to admission of water to the discharge conduit 7. The valve 18 may be urged to closed position by biasing means such, for example, as weight 41 connected to the extending end of the lever 37. This weight is preferably adjustable along the lever 37 so as to vary the control of the valve by the thermostat. It will be noted that the axis of the coil 30 extends transversely of the passageway, thus positioning the planes of the coil turns substantially in the direction of flow, thus permitting the fluid to contact more effectively with the entire length of each turn of the coil. Also the thermostat receiving chamber is enlarged or extended laterally of the fitting to provide increased flow space compensating for the obstruction caused by the thermostat and the thermostat extends into this extension.

The sensitive thermostatic element is preferably acclimated or "climated" to the particular position in which it is to be installed substantially as described in Patent No. 1,659,917 issued to James J. Lawler on February 21st, 1928. In this instance the sensitive thermostatic element will be filled with the thermo-responsive liquid at or slightly below the temperature reached by the element when installed in position in the discharge conduit with steam from the conduit in contact therewith. This is called the climatic temperature. Sealing of the sensitive element will be effected at the climatic temperature with the fluid or liquid completely filling the sensitive element. The filling and sealing temperature may be taken slightly below the degree of temperature reached by the thermostat under the conditions mentioned, so that the thermostat will begin to open the water inlet valve almost at the instant that steam begins passing through the discharge conduit.

It will now be understood that when steam or excessively hot water enters the discharge conduit 7 it will come into contact with the surfaces of the sensitive elements of the thermostat which are positioned directly in the path of flow. Due to this fact and to the further fact that there is a large surface area afforded by the thermostatic cell 24 and the coil 30, facilitating rapid heat exchange, the thermostat will respond very quickly to temperature changes in the discharge fluid. If steam enters the conduit it impinges the thermostat causing the latter to expand to open the water valve 18 through the system of connections described. The flow of steam or other fluid through the nozzle 16, at this time, gives rise to the injector action mentioned, and water from the water pipe will flow into the discharge conduit coming into contact with the steam therein and effecting a rapid condensation thereof. In this manner entry of live steam or excessively hot water in the sewer is prevented.

In the modification of the invention disclosed in Fig. 3, the general construction of the thermostatic fitting 13ª is similar to that described above, the discharge conduit being indicated at 7ª and connected to the extensions 20ª of the fitting. The plug 22ª is seated in a threaded opening in the fitting, through an opening in which extends the plunger 25ª positioned for contacting with the valve operating lever 35ª pivotally connected to a lug 34ª on the plug.

The sensitive thermostatic element 42 in this embodiment is in the form of a circumferentially corrugated, longitudinally expansible and contractible tube having a head 43 to which is connected the stem 25ª. The thermostatic element 42 is sealed to a base 44 of the plug or cap 23ª, the latter being threaded in an opening in the thermostatic fitting. The thermostatic element 42 preferably contains thermo-responsive fluid as already described in connection with the tube 24. The operation of this form is similar to that above described and will be understood without further detailed description.

In Figure 4 another form of sensitive thermostatic element is shown as assembled in a thermostatic fitting similar in general construction to that shown in Fig. 3. In this case the sensitive thermostatic element is in the form of a capsule 45 having opposed corrugated plates 46 sealed together at their adjacent edges as at 47. This capsule is preferably filled with the thermo-responsive fluid.

The upper plate or diaphragm 46 of the sensitive element is connected by a plunger 25ᵇ extending through the plug 22ᵇ to contact with the water valve operating lever 35ᵇ. The lower plate or diaphragm 45 is supported by means of a pedestal 48 seated in a pocket 49 formed in the inner face of the plug 23ᵇ.

The sensitive thermostatic elements of the modifications of both Figs. 3 and 4 are preferably positioned directly in the flow of the discharge fluid in the discharge conduit as already described above in connection with Fig. 2.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statement of the scope of the invention which, as a matter of language, might be said to fall therebetween.

Having described my invention, what I claim as new and desire to secure by Letters Patent is:

1. A thermostatic fitting for protective systems of the character described including, in combination, a member having a passageway or conduit therethrough adapted to form a part of a discharge conduit, a thermostat positioned within said passageway and supported by the fitting, and including a corrugated longitudinally expansible and contractible tubular cell extending transversely of the conduit, a removable plug seated in an opening in the fitting, a guiding and supporting casing for said tubular cell attached to said plug, and said casing and tubular cell being connected together at a point remote from said plug.

2. A thermostatic fitting for protective systems of the character described including, in combination, a member having a passageway or conduit therethrough adapted to form a part of a discharge conduit, a thermostat positioned within said passageway and supported by the fitting, said thermostat including a corrugated longitudinally expansible and contractible tubular cell extending transversely of the conduit, a removable plug seated in an opening in the fitting, a guiding and supporting casing for said tubular cell attached to said plug, said casing and tubular cell being connected together at a point remote from said plug, and a temperature sensitive tube also positioned in said passageway and communicating with the interior of said tubular cell.

3. A thermostatic fitting for protective systems of the character described including, in combination, a member having a passageway or conduit therethrough adapted to form a part of a discharge conduit, a thermostat positioned within said passageway and supported by the fitting, said thermostat including a corrugated longitudinally expansible and contractible tubular cell extending transversely of the conduit, a removable plug seated in an opening in the fitting, a guiding and supporting casing for said tubular cell and attached to said plug, a chambered header connected to the adjacent ends of said tubular cell and casing at a point thereof remote from said plug, and a temperature sensitive tubular coil positioned in said passageway and connected to and carried by said header, and having its interior in communication with the interior of said cell through the chamber of said header.

4. A thermostatic fitting for protective systems of the character described including, in combination, a member having a passageway or conduit therethrough adapted to form a part of a discharge conduit, a thermostat positioned within said passageway and supported by the fitting, said thermostat including a corrugated longitudinally expansible and contractible tubular cell extending transversely of the conduit, a removable plug seated in an opening in the fitting, operating connections from the thermostat extending through said plug, and a plug seated in an opening in said fitting and positioned adjacent the cell at a point remote from said first mentioned plug.

5. In a thermostatic fitting for protective systems, in combination a member having a passageway or conduit therethrough, a thermostat positioned within said passageway and supported by the fitting, said thermostat including a corrugated longitudinally expansible and contractible tubular cell containing a thermo-responsive fluid and extending transversely of the conduit directly in the path of fluid flow, a removable plug seated in an opening in the fitting, operating connections from said thermostatic tubular cell through said plug, a casing enclosing said cell and secured at one end to and carried by said plug and being free from attachment to the fitting at its opposite end, said casing being sealed to prevent entry of the fluid to the interior thereof, a chambered header connected to said cell and having its chamber in communication with the interior of said cell, and a temperature sensitive tubular coil containing thermo-responsive fluid and surrounding said cell and having its axis extending transversely of the conduit in the path of fluid flow, said coil being attached to and carried by said header with the interior thereof in communication with the interior of said cell through the chamber of said header.

6. In a thermostatic fitting for protective systems, in combination, a member having a passageway or conduit therethrough, a thermostat positioned within said passageway and supported by the fitting, said thermostat including a corrugated longitudinally expansible and contractible tubular cell extending transversely of the conduit, a removable plug seated in an opening in the fitting, operating connections from said thermostatic tubular cell through said plug, a casing enclosing said cell and secured to said plug and sealed to prevent entry of the fluid to the interior thereof, and a temperature sensitive tubular coil surrounding said cell and having its interior in communication with the interior of said cell.

7. In a thermostatic fitting for protective systems, in combination, a member having a passageway or conduit therethrough, a thermostat positioned within said passageway and supported by the fitting, said thermostat including a corrugated longitudinally expansible and contractible tubular cell containing a thermo-responsive fluid and extending transversely of the conduit directly in the path of fluid flow, a removable plug seated in an opening in the fitting, operating connections from said thermostatic tubular cell through said plug, a casing enclosing said cell and secured at one end to and carried by said plug and being free from attachment to the fitting at its opposite end, said casing being sealed to prevent entry of the fluid to the interior thereof, a chambered header connected to said cell and having its chamber in communication with the interior of said cell, a temperature sensitive tubular coil containing thermo-responsive fluid and surrounding said cell and having its axis extending transversely of the conduit in the path of fluid flow, said coil being attached to and carried by said header with the interior thereof in communication with the interior of said cell through the chamber of said header, and a plug seated in an opening in the fitting, adjacent to said header to provide access to the latter when the plug is removed.

In testimony whereof I affix my signature.

JAMES J. LAWLER.